(12) United States Patent
Lindgren et al.

(10) Patent No.: US 10,359,500 B2
(45) Date of Patent: Jul. 23, 2019

(54) ESTIMATION OF A POSITION OF AN ELECTRONIC LABEL

(71) Applicant: Pricer AB, Stockholm (SE)

(72) Inventors: Anders Erik Lindgren, Stockholm (SE); Ernst Håkan Sjödin, Stockholm (SE)

(73) Assignee: Pricer AB, Stockholm (SE)

( * ) Notice: Subject to any disclaimer, the term of this patent is extended or adjusted under 35 U.S.C. 154(b) by 213 days.

(21) Appl. No.: 15/434,651

(22) Filed: Feb. 16, 2017

(65) Prior Publication Data
US 2017/0242093 A1  Aug. 24, 2017

(30) Foreign Application Priority Data
Feb. 18, 2016 (EP) .................................... 16156339

(51) Int. Cl.
*G01S 5/02* (2010.01)
(52) U.S. Cl.
CPC .............. *G01S 5/0252* (2013.01); *G01S 5/02* (2013.01); *G01S 5/0221* (2013.01)
(58) Field of Classification Search
CPC ......... G01S 5/0252; G01S 5/0221; G01S 5/02
See application file for complete search history.

(56) References Cited

U.S. PATENT DOCUMENTS

| | | | |
|---|---|---|---|
| 2008/0052201 A1* | 2/2008 | Bodin | G06Q 10/087 705/28 |
| 2011/0043373 A1 | 2/2011 | Best et al. | |
| 2013/0082878 A1* | 4/2013 | Jarvis | G01S 5/02 342/458 |

OTHER PUBLICATIONS

European Search Report to corresponding European application 16156339.0 dated Aug. 5, 2016, 14 pages.
Xingfa Shen et al: "Connectivity and RSSI Based Localization Scheme for Wireless Sensor Networks" Jan. 1, 2005, . Advances in Intelligent Computing Lecture Notes in Computer Science;;LNCS. Springer. Berlin. DE. pp. 578-587. XP019017104. ISBN: 978-3-548-28227-3, equations (3). (4) and (8) abstract section 3 W—Centroid Localization Scheme.

(Continued)

*Primary Examiner* — Brandon J Miller
(74) *Attorney, Agent, or Firm* — Cooper Legal Group, LLC; Ronald M. Kachmarik (57) ABSTRACT

A system and method for estimating a position of an electronic label in an area are provided. A plurality of devices is distributed over the area. Information is obtained about signal strengths recorded at the respective devices when attempting to receive a wireless signal transmitted by the electronic label. Weights are formed for positions associated with the devices, based on the signal strengths recorded at the corresponding devices. The position of the electronic label is estimated as a weighted average including the positions, wherein the positions are weighted by the weights. In some embodiments, information is instead obtained about signal strengths recorded at the electronic label when attempting to receive wireless signals transmitted by the respective devices. The present method may for example be employed to estimate a position of a product in a retail store.

18 Claims, 4 Drawing Sheets

(56) References Cited

OTHER PUBLICATIONS

Lionel M Ni et al: "LANMARC: Indoor Location Sensing Using Active RFID", Wireless Networks, The Journal of Mobile Communication, Computation and Information, Kluwer Academic Publishers, DO, vo 1. 10, No. 6. Nov. 1, 2004 {Nov. 1, 2004), pp. 701-710, XP019216716, ISSN: 1572-8196, DOI: 10.1023/B:WINE.0000044029. 06344.DD , figure 4, section 1. Introduction, section 4. LANDMARC approach , section 4.1. System setup, section 4.2. Methodology.
Kuen-Liang Sue et al: "BLOCS: A Smart Book-Locating System Based on RFID in Libraries", Service Systems and Service Management, 2007 International Conference on, IEEE,PI, Jun. 1, 2007 (Jun. 1, 2007), pp. 1-6, XP031120461, DOI: 10.1109/ICSSSM.2007. 4280198 ISBN: 978-1-4244-0884-9; section 2. Related Work, section 3. BLOCS, section 3.1 Single Book Mode.
Talvitie Jukka et al: "Modeling Received Signal Strength measurements for cellular network based positioning", 2013 International Conference on Localization and GNSS (ICL-GNSS), IEEE, Jun. 25, 2013 (Jun. 25, 2013), pp. 1-6, XP032477988, ISSN: 2325-0747, DOI: 10.1109/ICL.GNSS.2013.6577278 ISBN: 978-1-4799-0484-6 [retrieved on Aug. 8, 2013]; abstract, section III.B. Network Topology Design.

\* cited by examiner

ESTIMATION OF A POSITION OF AN ELECTRONIC LABEL

TECHNICAL FIELD

The present disclosure generally relates to estimation of a position of an electronic label.

BACKGROUND

Products in a retail store may be arranged at respective product positions along fixtures such as shelves, racks or other displays. The product positions may for example be selected to maximize sales by promoting certain products and/or to improve logistics of the store. Product positions for at least some products may be changed quite often and it may be difficult to maintain an updated record of the actual product positions.

Knowledge of the actual product positions may for example save time when products are restocked as persons bringing new items of the products to the fixtures of the store (e.g. from a storage room, a warehouse, or a supply truck) need not search through the fixtures of the store for the correct product positions at which to arrange the new items of the respective products.

The position of an object may generally be determined or estimated using signals transmitted between the object and a number of reference points. Received signal strengths for such signals indicate the distances traveled by the signals, which may be employed to estimate the distances between the object and the reference points. Using methods such as trilateration, the position of the object may then be estimated based on these distances.

A retail store may contain many obstacles (such as fixtures and products) which may obstruct signals or which may cause signals to be reflected (or attenuated) before reaching a sensor recording the received signal strength. The above described positioning methods may therefore be relatively inaccurate when applied in a retail store. Hence, new methods and systems for estimating positions are desirable.

SUMMARY

To better address one or more of the above mentioned issues, methods and systems having the features defined in the independent claims are provided. Associated computer program products are also provided. Preferable embodiments are defined in the dependent claims.

Hence, according to a first aspect, there is provided a method for estimating a position of an electronic label in an area. A plurality of devices is distributed over the area. The method comprises: obtaining information about signal strengths recorded at the respective devices when attempting to receive a wireless signal transmitted by the electronic label; forming weights, for positions associated with the devices, based on the signal strengths recorded at the corresponding device; and estimating the position of the electronic label as a weighted average including the positions, wherein the positions are weighted by the weights.

The above described method employs signal strengths recorded at the devices. As an alternative, signal strengths recorded at the electronic label may be employed. In other words, instead of the above described steps, the method may comprise: obtaining information about signal strengths recorded at the electronic label when attempting to receive wireless signals transmitted by the respective devices; forming weights, for positions associated with the devices, based on the signal strengths recorded at the electronic label for the corresponding devices; and estimating the position of the electronic label as a weighted average including the positions, wherein the positions are weighted by the weights.

In an ideal situation where there are no objects obstructing the wireless signal transmitted by the electronic label, a signal strength recorded at one of the devices when attempting to receive the wireless signal is indicative of the distance traveled by the wireless signal, and thereby also of the distance between the electronic label and the device. Devices Device located closer to the electronic label will therefore typically record higher signal strengths than devices located further away from the electronic label. The weighted average of positions associated with the devices (using weights based on the recorded signal strengths at the respective devices) therefore provides an approximation of the position of the electronic label.

Similarly, a signal strength recorded at the electronic label when attempting to receive a wireless signal transmitted from one of the devices is indicative of the distance traveled by the wireless signal, and thereby also of the distance between the electronic label and the device. Higher signal strengths will therefore typically be recorded at the electronic label for devices located closer to the electronic label than for devices located further away from the electronic label. The weighted average of positions associated with the devices (using weights based on the recorded signal strengths at the electronic label) therefore provides an approximation of the position of the electronic label.

In case a recorded signal strength is much weaker than it should be, e.g. due to the signal being obstructed by an obstacle, this single deviation may have large impact on position estimates obtained by methods such as trilateration, since the low signal strength indicates a long distance between the electronic label and the device at which the low signal strength was recorded (or the device from which the signal was transmitted to the electronic label recording the low signal strength).

In contrast, such a deviation only has a limited impact on the weighted average, and thereby on the estimated position provided by the present method. In other words, the estimated position of the electronic label provided by the present method is more robust to errors (or inaccuracies) in the recorded signal strengths.

The electronic label may for example comprise a light source arranged to transmit the wireless signal.

The electronic label may for example be arranged in the area for visually conveying information about a product in its vicinity. The electronic label may for example comprise a display arranged to convey the information. The display may for example be distinct from a light source transmitting the wireless signal.

It will be appreciated that the signal strengths recorded at the devices are recorded when the devices attempt to receive the wireless signal. Similarly, it will be appreciated that the signal strengths recorded at the electronic label are recorded when the electronic label attempts to receive the respective wireless signals.

The devices may for example attempt to receive the wireless signal during a certain time interval, e.g. in a measurement interval during which the electronic label is expected to transmit the wireless signal.

If a device successfully receives the wireless signal transmitted by the electronic label, the strength of the received signal may be recorded as a received signal strength value or as a received signal strength indicator (RSSI).

If a device is not able to receive the wireless signal transmitted by the electronic label (e.g. since the wireless signal is too weak when it arrives to the device), the device may for example record zero as the received signal strength.

The area may for example be a floor of a building, a room (or a part of a room), or an area outside.

The estimated position may for example be a two-dimensional position, such as a position in the form of an x coordinate and a y coordinate.

Embodiments may also be envisaged in which the estimated position is a three-dimensional position, e.g. in the form of an x coordinate, a y-coordinate and a z-coordinate.

The devices may for example be distributed in the area.

It will be appreciated that at least some of the devices may for example be distributed above or below the area (e.g. in the ceiling or in the floor of a room).

The positions associated with the devices may for example be the positions of the devices themselves, for example in the form of x and y coordinates of the devices in the area.

As will be described in embodiments further below, the positions associated with the devices may for example include positions other than the positions of the devices themselves. For example, the weighted average may include more than one position associated to the same device.

The weights may for example be formed as the recorded signal strengths themselves, or may be formed by processing the recorded signal strengths.

The positions included in the weighted average may for example be the positions of the devices themselves, and the weight for each of these positions may for example be formed based on the signal strength recorded at that device (or the signal strength recorded at the electronic label for the wireless signal transmitted from that device).

The devices may for example include respective receivers for receiving wireless signals, and/or transmitters for transmitting wireless signals.

The devices may for example be transceivers able receive and transmit wireless signals.

The weighted average may for example include only the positions associated with the devices, or may include also other positions.

According to some embodiments, the electronic label may be arranged in the area for visually conveying information about an object in its vicinity. The method may comprise estimating a position of the object as the weighted average.

Electronic labels are employed in many places to convey information about objects in its vicinity. As the electronic label is arranged in the vicinity of (or relatively close to, or adjacent to) the object, the position of the object may be estimated by the same position as the electronic label, i.e. by the weighted average.

Since the electronic label is already employed for another purpose (i.e. visually conveying information about the object), the present embodiments require no extra devices or arrangements at the product position for estimating the position of the object.

The object may for example be a fixture (such as a shelf, rack or other display) or a product. The object may for example be moving or movable, such as a trolley, a basket or some other object which one may wish to keep track of. The object may for example be arranged in a retail store.

The information conveyed may for example be the price of a product.

According to some embodiments, a device (or each of the devices) may be adapted to receive signals from a first direction and from a second direction. The obtained information may include information about signal strengths recorded at the device when attempting to receive the wireless signal from the first direction and from the second direction, respectively. The weighted average may include a first position spaced a distance from the device in the first direction, and a second position spaced a distance from the device in the second direction. The weight by which the first position is weighted in the weighted average may be based on the recorded signal strength for the first direction. The weight by which the second position is weighted in the weighted average may be based on the recorded signal strength for the second direction.

The accuracy of the estimated position of the electronic label may potentially be increased by increasing the number of devices, but an increased number of devices may be expensive and may require a lot of space for mounting the devices.

Instead of employing additional devices to increase accuracy of the position estimate, the devices may be equipped with the ability to receive signals from different directions, and to distinguish between signals received from the different directions. A higher signal strength for a signal received from the first direction than from the second direction may indicate that the direction to the electronic label is closer to the first direction than to the second direction. This may be taken into account in the weighted average by employing the first and second position weighted based on the recorded signal strengths for the first and second directions, respectively. Tests have shown that the accuracy of the estimated position of the electronic label may be improved by including the first and second positions in the weighted average, compared to using the position of the device in the weighted average. Hence, the accuracy of the estimated position may be increased while keeping costs and space requirements down.

A weighted average of positions may not result in a position outside the convex combination of the positions included in the average. Use of the first and second positions (which are spaced from the device in the first and second direction, respectively) in the weighted average allows for extending the region in which estimated positions may be obtained. For further details, see the embodiments described with reference to FIG. 3 in the section "Detailed description".

It will be appreciated that the first position and the second position are positions associated with the device.

It will also be appreciated that the device may for example be adapted to receive signals from more than two directions, such as from four directions, and that the weighted average may include four positions associated with the device, weighted based on recorded signal strengths for the respective directions, in analogy with the case of a first and a second position, described above.

It will be appreciated that each of the devices may for example be adapted to receive signals from a first direction and a second direction, in analogy with the device described above, and that the weighted average may be modified to include first and second positions for each of the devices.

According to some embodiments, the devices may be spaced from each other by a first distance. The first position and the second position may both be located at a second distance from the device. The first distance may be longer than the second distance.

Tests have shown that the accuracy of the estimated position of the electronic label may generally be higher if the first distance is longer than the second distance.

The first distance may preferably be at least twice as long as the second distance to prevent positions associated with different devices from overlapping.

If the second distance is too short relative to the first distance, the positive effect of using two recorded signal strengths for a device is reduced. The first distance may therefore be between 2 and 10 times as long as the second distance.

According to some embodiments, the method may comprise: obtaining information about signal strengths recorded at the respective devices when attempting to receive a wireless signal transmitted by a reference electronic label; or obtaining information about signal strengths recorded at a reference electronic label when attempting to receive wireless signals transmitted by the respective devices. The method may comprise comparing the recorded signal strengths associated with the electronic label to the recorded signal strengths associated with the reference electronic label. The method may comprise: in response to a pattern formed by the recorded signal strengths associated with the electronic label being sufficiently similar to a pattern formed by the recorded signal strengths associated with the reference electronic label, estimating the position of the electronic label based on a position of the reference electronic label.

The accuracy of the estimated position provided by the weighted average may depend on where the electronic label is arranged relative to the devices, and whether there are any objects obstructing the wireless signal (or wireless signals). In certain regions of the area, the weighted average may be relatively less accurate. For example, if all devices are arranged to the left of a subarea in which the electronic label is arranged, the weighted average may not be able to provide an estimated position within that subarea (unless positions other than the positions of the devices are included in the weighted average).

If the pattern for the electronic label is similar to the pattern for the reference electronic label, this may indicate that the electronic label is located relatively close to the reference electronic label. Hence, arranging reference electronic labels in subareas where estimation of the position or the electronic label via the weighted average is expected to be relatively less accurate allows the accuracy of the estimated position of the electronic label to be improved.

Arranging reference electronic labels in the area may be less expensive and/or may occupy less space than arranging additional devices in (or above) the area.

The position of the reference electronic label may be known a priori. The position of the reference electronic label may for example have been determined manually (e.g. when the reference electronic label was mounted), or may have been determined by some other method.

The position of the electronic label may for example be estimated as the position of the reference electronic label.

The reference electronic label may for example be the same type of label as the electronic label, but the position of the reference electronic label may be known, while the position of the electronic label is to be estimated.

Multiple reference electronic labels may for example be arranged in the area. If patterns of recorded signal strengths for several reference electronic labels are sufficiently similar to the pattern of recorded signal strengths for the electronic label, the position of the electronic label may for example be estimated as an average (e.g. a weighted average) of the positions of these several reference electronic labels.

According to some embodiments, the method may comprise: obtaining a value by applying a function to the recorded signal strengths associated with the electronic label and the recorded signal strengths associated with the reference electronic label, wherein the obtained value is indicative of a similarity between the two patterns, the two patterns being sufficiently similar on a condition that the obtained value is above a threshold; or obtaining a value by applying a function to the recorded signal strengths associated with the electronic label and the recorded signal strengths associated with the reference electronic label, wherein the obtained value is indicative of a dissimilarity between the two patterns, the two patterns being sufficiently similar on a condition that the obtained value is below a threshold.

The obtained value indicative of a similarity between the two patterns may for example be a correlation between the two patterns. The function applied when obtaining this value may for example be adapted to provide the correlation as output.

The obtained value indicative of a dissimilarity between the two patterns may for example be a Euclidean distance (or some other type of distance, metric or norm) between the two patterns of recorded signal strengths. The function applied when obtaining this value may for example be adapted to provide the Euclidean distance as output.

According to some embodiments, the method may comprise, for one or more reference electronic labels arranged in the area: obtaining information about signal strengths recorded at the respective devices when attempting to receive a wireless signal transmitted by the reference electronic label (or obtaining information about signal strengths recorded at a reference electronic label when attempting to receive wireless signals transmitted by the respective devices); and comparing the recorded signal strengths associated with the electronic label to the recorded signal strengths associated with the reference electronic label. The method may comprise: in response to a pattern formed by the recorded signal strengths associated with the electronic label being sufficiently similar to a pattern formed by the recorded signal strengths associated with a reference electronic label of the one or more reference electronic labels, estimating the position of the electronic label based on a position of the reference electronic label; and in response to the pattern formed by the recorded signal strengths associated with the electronic label not being sufficiently similar to the pattern formed by the recorded signal strengths associated with any of the one or more reference electronic labels, forming the weights and estimating the position of the electronic label as the weighted average.

Instead of selecting whether to estimate the position of the electronic label as the weighted average or whether to estimate it based on positions of reference electronic labels, as described above, the positions of one or more reference electronic labels may be included in the weighted average (i.e. in the weighted average including the positions associated with the devices). Hence, according to some embodiments, the method may comprise: obtaining information about signal strengths recorded at the respective devices when attempting to receive a wireless signal transmitted by a reference electronic label; or obtaining information about signal strengths recorded at a reference electronic label when attempting to receive wireless signals transmitted by the respective devices. The method may further comprise: forming a weight based on a similarity between a pattern formed by the recorded signal strengths associated with the electronic label and a pattern formed by the recorded signal strengths associated with the reference electronic label. A position of the reference electronic label may be included in the weighted average. The weight by which the position of the reference electronic label is weighted in the weighted average is the formed weight.

The similarity between the pattern formed by the recorded signal strengths associated with the electronic label and the pattern formed by the recorded signal strengths associated with the reference electronic label may for example be computed as a correlation between the two patterns.

The weight may for example be formed as a value proportional to the similarity.

Instead of actually computing a similarity between the two patterns, a dissimilarity between the two patterns may for example be computed (e.g. as a Euclidean distance between the two patterns, or as some other type of distance, metric or norm).

The weight may for example be formed as a value inversely proportional to the computed dissimilarity.

According to some embodiments, the reference electronic label may be arranged along an edge of the area.

In case none of the devices are arranged along the edge of the area, the weighted average (i.e. if only including positions of the devices) may not be able to accurately estimate positions of the electronic label along the edge. Arranging the reference electronic label along the edge of the area may therefore improve the ability of the method to estimate positions of the electronic label along the edge of the area, without having to provide additional devices along the edge.

According to some embodiments, the reference electronic label (or reference electronic labels) may for example be arranged outside the convex hull (or convex envelope) of the positions associated with the devices. In other words, the reference electronic label may be arranged outside the smallest convex set (or smallest convex area) containing the positions associated with the devices. This may allow positions outside the convex hull of the positions of the devices to be more accurately estimated.

According to some embodiments, a container may be arranged in the area, and the reference electronic label may be arranged in the container.

Products in a retail store may for example be arranged in a container such as a fridge or freezer. Electronic labels may be arranged in the freezer to convey information about the products, such as the prices of the products. Wireless signals transmitted by such electronic labels arranged in a container may be obstructed by the container, at least in some directions. This may degrade the accuracy of the weighted average as an estimate of the position of the electronic label.

Signals transmitted by a reference electronic label arranged in the same container as the electronic label may be subjected to similar obstructions, so the patterns of recorded signal strengths may be similar for these two labels. The ability to estimate the position of the electronic label based on the position of the reference electronic label (or to include the position of the reference electronic label in the weighted average) therefore allows for improving the accuracy of the estimated position.

According to some embodiments, the container may comprise a door (or shutter or hatch). The reference electronic label may be arranged in the container behind the door of the container.

The door of the container may for example disrupt at least some wireless signals, even if the door comprises a material which is transparent to visible light, such as glass or a plastic material.

The reference electronic label may for example be arranged in an interior of the container located behind the door (or shutter or hatch). The door may for example at least partially separate the interior of the container from the outside of the container.

According to some embodiments, the weights employed for the respective positions in the weighted average may be signal strength values according to a logarithmic scale. Use of signal strength values according to a logarithmic scale has shown in tests to provide estimated positions with the desired accuracy.

The signal strengths values employed as weights may for example be given in decibel.

According to some embodiments, the wireless signal transmitted by the electronic label may be an infrared signal or a radio frequency signal. In other words, light in the infrared frequency range or in the radio frequency range may be employed by the electronic label to transmit the wireless signal.

According to some embodiments, the wireless signals transmitted by the respective devices may be infrared signals or radio frequency signals.

According to some embodiments, the method may comprise controlling a transmitter to transmit a signal to the electronic label for triggering the electronic label to transmit the wireless signal.

The devices may for example attempt to receive the wireless signal during a time interval after the transmitter has been controlled to transmit the signal to the electronic label.

The transmitter may for example be integrated in one of the devices or may be arranged separately.

The signal transmitted to the electronic label may be wired or wireless.

According to a second aspect, there is provided a computer program product comprising a computer-readable medium with instructions for performing the method according to any embodiment of the first aspect.

The advantages presented above for features of methods, according to the first aspect, may generally be valid for the corresponding features of computer programs products according to the second aspect.

The computer-readable medium may for example store or carry instructions for causing a computer to perform the method according to any embodiment of the first aspect.

The computer-readable medium may for example be a transitory storage medium (such as a carrier wave), or a non-transitory storage medium.

According to a third aspect, there is provided a system for estimating a position of an electronic label in an area. The system is configured to: obtain information about signal strengths recorded at respective devices when attempting to receive a wireless signal transmitted by the electronic label; form weights, for positions associated with the devices, based on the signal strengths recorded at the corresponding devices; and estimate the position of the electronic label as a weighted average including the positions, wherein the positions are weighted by the weights.

The advantages presented above for features of methods, according to the first aspect, may generally be valid for the corresponding features of systems according to the third aspect.

The devices may for example be distributed over the area.

The system may for example be arranged in communication with the devices.

The system may for example comprise processing means (e.g. a processing section, or distributed processing resources) configured to: obtain information about signal strengths recorded at respective devices when attempting to receive a wireless signal transmitted by the electronic label (or obtain information about signal strengths recorded at the electronic label when attempting to receive wireless signals transmitted by the respective devices); form weights, for positions associated with the devices, based on the signal strengths recorded at the corresponding devices (or form weights, for positions associated with the devices, based on the signal strengths recorded at the electronic label for the corresponding devices); and estimate the position of the electronic label as a weighted average including the positions, wherein the positions are weighted by the weights.

According to some embodiments, the system may comprise a plurality of devices distributed over the area. A device (or each of the devices) may be adapted to receive signals from a first direction and from a second direction. The obtained information may include information about signal strengths recorded at the device when attempting to receive the wireless signal from the first direction and from the second direction, respectively. The weighted average may include a first position spaced a distance from the device in the first direction and a second position spaced a distance from the device in the second direction. The weight by which the first position is weighted in the weighted average may be based on the recorded signal strength for the first direction. The weight by which the second position is weighted in the weighted average may be based on the recorded signal strength for the second direction.

It is noted that embodiments of the present disclosure relate to all possible combinations of features recited in the claims. Further, it will be appreciated that the various embodiments described for the method, according to the first aspect, are all combinable with embodiments of the system according to the third aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
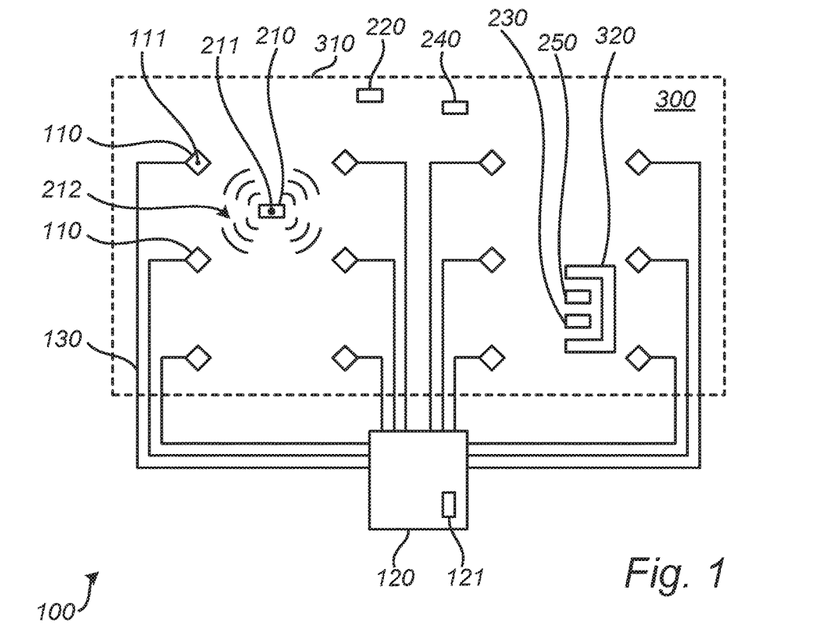
FIG. 1 is an overview of a system for estimating a position of an electronic label in an area, according to an embodiment.

FIG. 1 is an overview of a system 100 for estimating a position 211 of an electronic label 210 in an area 300, according to an embodiment. The system 100 comprises a plurality of devices 110 distributed over the area 300, and processing means 120 communicatively connected to the devices 110.

The devices 110 are configured to receive a wireless signal 212 transmitted by the electronic label 210 and to record received signal strengths.

The processing means 120 is configured to obtain information about signal strengths recorded at respective devices 110 when attempting to receive the wireless signal 212 transmitted by the electronic label 210. For positions 111 associated with the devices 110, the processing means 120 forms weights based on the signal strengths recorded at the corresponding devices 110. The processing means 120 then estimates the position 211 of the electronic label 210 as a weighted average including the positions 111. In this weighted average, the positions 111 are weighted by the weights formed by the processing means 120.

The area 300 may for example be a room (or a part thereof), a floor (or a part thereof) in a building, or an area outside.

The area 300 may for example be treated as a two-dimensional area in which a position 211 of the electronic label 210 is to be estimated. Positions in the area 300 may for example be described by respective coordinates along an x-axis and a y-axis.

Denoting the positions 111 associated with the devices 110 by $(x_i, y_i)$ and the weights by $w_i$, the weighted average estimating the position 211 of the electronic label 210 may be expressed as $$(x_0, y_0) = \left( \frac{\sum_{i=1}^{N} w_i x_i}{\sum_{i=1}^{N} w_i}, \frac{\sum_{i=1}^{N} w_i y_i}{\sum_{i=1}^{N} w_i} \right)$$

where N is the number of devices 110.

In the present example, the positions $(x_i, y_i)$ associated with the devices 110 are the positions 111 of the devices 110 themselves, i.e. the weighted average includes exactly one position for each device 110. As will be described further below, with reference to FIG. 3, the positions $(x_i, y_i)$ associated with the devices 110 (and included in the weighted average) may for example be other positions than the positions 111 of the devices 110. As will also be described further below, the weighted average may for example include further positions in addition to the positions associated with the devices 110.

The weights $w_i$ for the respective positions $(x_i, y_i)$ may for example be formed as the recorded signal strengths at the corresponding devices 110. Signal strength values may for example be recorded in a logarithmic scale such as dB, and these values may for example be employed as weights $w_i$ in the weighted average.

For example, the signal strengths may be recorded in a discrete logarithmic scale in 16 steps from 0 to 15, where 0 corresponds to no signal being received (or the signal received being weaker than a threshold), and where 15 corresponds to the received signal being very strong. These discrete values may then be employed as weights $w_i$ for the positions $(x_i, y_i)$ of the devices 110 at which the respective signal strengths were recorded.

Use of signal strengths in a logarithmic scale as weights has shown in experiments to yield good estimation results.

Other weights $w_i$ may also be envisaged. For example, the recorded signal strengths may be squared or processed in some other way before being employed as weights.

Figure 2:
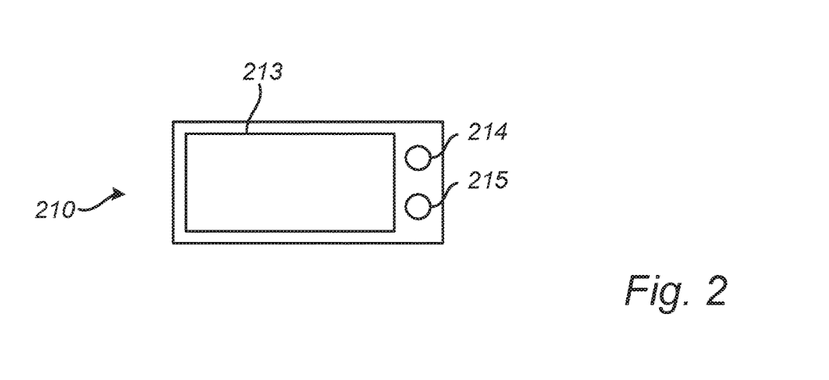
FIG. 2 shows details of the electronic label.

FIG. 2 shows details of the electronic label 210 (the labels 220, 230, 240 and 250 described below with reference to FIG. 1 may also be of this type).

The electronic label 210 comprises a display (or screen) 213 arranged to visually convey information about a product (or an object) associated with the electronic label 210, such as product arranged just above or just below the electronic label 210. The display 213 may for example be a backlit display (e.g. a flat panel backlit display) or a display providing light output based on reflection of ambient light. The display 213 may for example be a reflective LCD display or a display based on electronic paper for proving light output, which may save power compared to use of backlit displays.

The electronic label 210 may comprise one or more receivers 214 (or receiving sections) arranged to receive wireless control signals indicating what to display on the screen 213. The receiver 214 may for example be arranged to receive radio-based control signals or control signals based on infrared light.

In some embodiments, the electronic label 210 may be arranged to receive wired control signals, for example via wires (or connections) provided in a fixture (e.g. a shelf, rack or other display) on which it is arranged.

The electronic label 210 comprises one or more transmitters 215 for transmitting wireless signals. The transmitter 215 may for example be a light emitting diode (LED) arranged to transmit infrared signals or radio frequency signals.

Wireless signals transmitted by different electronic labels 210 may for example have different temporal patterns, or may be transmitted at different points in time, so that the devices 110 are able to identify the electronic label 210 from which a received signal originates.

The electronic label 210 may for example comprise an internal power supply (e.g. a battery) or may be connected to an external power source such as line power (or mains electricity).

In the system 100, described with reference to FIG. 1, the devices 110 may for example be arranged in the ceiling above the area 300. Embodiments may also be envisaged in which at least some of the devices 110 are arranged on fixtures in the area 300, or in the floor below the area 300.

The devices 110 may for example be evenly distributed over the area 300, for providing position estimates of similar accuracy throughout the area 300 (or throughout a main portion of the area 300).

The positions 111 of the devices may have been determined at some earlier point time, either manually or by some automatic method. The positions 111 of the devices may be stored in a memory 121. The processing means 120 may have access to the memory 121. The memory 121 may for example be comprised in the processing means 120.

Each of the devices 110 may comprise one or more receiving sections (or optical sensors) for receiving the wireless signal 212 transmitted by the electronic label 210.

The devices 110 may for example be transceivers with the ability to transmit wireless signals to the electronic label 210 for triggering the electronic label 210 to transmit the wireless signal 212 employed for estimating the position 211 of the electronic label 210. The transceivers 110 may for example comprise a transmitting section (e.g. including one or more LEDs) for transmitting infrared or radio-based control signals to the electronic label 210.

The processing means 120 may for example be a separate control device connected to the devices 110 via wires 130 or via wireless connections. The control device may for example be arranged outside the area 300, such as in another room.

The processing means 120 may for example be provided in the form of a collection of computers connected to the devices 110 via a network (such as the internet) and performing distributed computing (or cloud computing).

Embodiments may also be envisaged in which the processing means 120 is provided in the form of one or more processing sections arranged in one or more of the devices 110.

In the system 100, described above with reference to FIG. 1, the positions 111 of the devices 110 themselves were included in the weighted average approximating the position 211 of the electronic label 210. However, in some embodiments, other positions associated with the devices 110 may be included in the weighted average. Such an embodiment will now be described with reference to FIG. 3, which shows positions 116-119 associated with a device 110.

Figure 3:
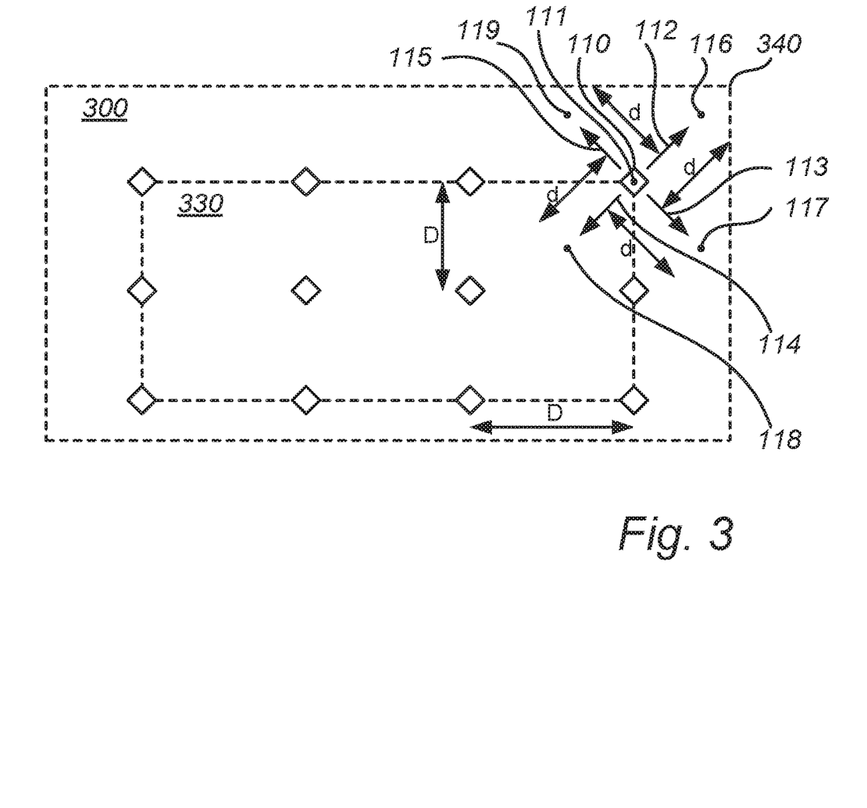
FIG. 3 shows positions associated with a device in a system for estimating a position of an electronic label, according to an embodiment.

The device 110 shown in FIG. 3 is adapted to receive wireless signals from multiple directions 112-115, and has the ability to distinguish between signals received from these different directions 112-115. This may be described as the device 110 having different channels for receiving wireless signals from the respective directions 112-115.

In the present embodiment, the device 110 is adapted to receive wireless signals from a first direction 112 and from a second direction 113 (i.e. the device 110 has at least two channels). The information obtained by the processing section 120 from the device 110 includes information about signal strengths recorded at the device 110 (i.e. recorded by the two channels of the device 110) when attempting to receive the wireless signal (transmitted from the electronic label 210) from the first direction 112 and from the second direction 113, respectively.

In the present embodiment, the weighted average includes a first position 116 spaced a distance d from the device 110 in the first direction 112 (i.e. the first position 116 is arranged at a distance d from the device 110 in the first direction 112) and a second position 117 spaced a distance d from the device 110 in the second direction 113 (i.e. the second position 117 is arranged at a distance d from the device 110 in the second direction 113).

The weight by which the first position 116 is weighted in the weighted average is based on the recorded signal strength for the first direction 112 (i.e. it is based on the signal strength recorded by the first channel). The weight by which the second position 117 is weighted in the weighted average is based on the recorded signal strength for the second direction 113 (i.e. it is based on the signal strength recorded by the second channel).

In the present example, corresponding positions and weights are included in the weighted average for each of the devices 110. Denoting the positions 116-117 associated with device 110 number i by $(x_{i,k}, y_{i,k})$, k=1, 2, and the associated weights by $w_{i,k}$ k=1, 2, the weighted average estimating the position 211 of the electronic label 210 may be expressed as $$(x_0, y_0) = \left( \frac{\sum_{k=1}^{2} \sum_{i=1}^{N} w_{i,k} x_{i,k}}{\sum_{k=1}^{2} \sum_{i=1}^{N} w_{i,k}}, \frac{\sum_{k=1}^{2} \sum_{i=1}^{N} w_{i,k} y_{i,k}}{\sum_{k=1}^{2} \sum_{i=1}^{N} w_{i,k}} \right)$$

where N is the number of devices 110.

As described with reference to FIG. 1, the recorded signal strengths may be employed directly as the weights $w_{i,k}$, or the recorded signal strength may be processed before being employed as weights $w_{i,k}$.

As shown in FIG. 3, the first direction 112 and the second direction 113 are directions opposite to each other such that an average of the first position 116 and the second position 117 is the position 111 of the device 110 itself.

In some embodiments, the device 110 is adapted to receive wireless signals also from a third direction 114 and from a fourth direction 115 (i.e. the device 110 has four channels). The information obtained by the processing section 120 from the device 110 may then also include information about signal strengths recorded at the device 110 when attempting to receive the wireless signal (transmitted from the electronic label 210) from the third direction 114 and from the fourth direction 115, respectively. The weighted average then includes a third position 118 spaced a distance d from the device 110 in the third direction 114 (i.e. the third position 118 is arranged at a distance d from the device 110 in the third direction 118) and a fourth position 119 spaced a distance d from the device 110 in the fourth direction 115 (i.e. the fourth position 119 is arranged at a distance d from the device 110 in the fourth direction 115). The weight by which the third position 118 is weighted in the weighted average is based on the recorded signal strength for the third direction 114 (i.e. it is based on the signal strength recorded in the third channel). The weight by which the fourth position 119 is weighted in the weighted average is based on the recorded signal strength for the fourth direction 115 (i.e. it is based on the signal strength recorded in the fourth channel).

Denoting the positions 116-119 associated with device 110 number i by $(x_{i,k}, y_{i,k})$, k=1, 2, 3, 4, and the associated weights by $w_{i,k}$, k=1, 2, 3, 4, the weighted average estimating the position 211 of the electronic label 210 may be expressed as $$(x_0, y_0) = \left( \frac{\sum_{k=1}^{4} \sum_{i=1}^{N} w_{i,k} x_{i,k}}{\sum_{k=1}^{4} \sum_{i=1}^{N} w_{i,k}}, \frac{\sum_{k=1}^{4} \sum_{i=1}^{N} w_{i,k} y_{i,k}}{\sum_{k=1}^{4} \sum_{i=1}^{N} w_{i,k}} \right)$$

where N is the number of devices 110.

The signal strengths recorded from the different directions 112-115 together convey information about a direction from the device 110 in which the electronic label 210 is located. Employing the signal strengths as weights for respective positions 116-119 spaced from the real device position 111 in the respective directions 112-115, and including these positions in the weighted average, is a way to make use of this directional information. The accuracy of the obtained estimate of the position 211 of the electronic label 210 may therefore be improved.

Weighted averages of positions 111 of the devices 110 are always located in a subarea 330 of the area 300, wherein the boundaries of the subarea 330 are defined by the outermost devices 110. Employing positions 116-119 spaced from the device positions 111 in different directions 112-115 allows the weighted average to provide estimated label positions outside the subarea 330. The subarea 330 is the smallest convex set containing the positions 111 of the devices 110, and may be referred to the convex hull of the positions 111 of the devices 110.

The area 300 may have more or less any shape. In case the area 300 is a rectangle, and in case the devices 110 are arranged at a distance from the edges of the area 300, the devices 110 may for example be oriented such that one of the directions 112-115 is directed from a device 110 towards the corner 340 of the area 300. This allows one position 116 of the positions 116-119 to be located closer to the corner 340 than the device 110 (as shown in FIG. 3). This allows the weighted average to provide estimated positions closer to the corner 340.

The devices 110 may be spaced from each other by a first distance D. The first distance D may for example be in the range 10-15 m.

The first position 116, the second position 117, the third position 118 and the fourth position 119 may all be located at a second distance d from the device 110. The second distance may for example be in the range 1-10 m.

Experiments indicate that higher estimation accuracy is generally obtained if the first distance D is longer than the second distance d.

The first distance may preferably be at least twice as long as the second distance to prevent positions associated with different devices from overlapping.

If the second distance is too short relative to the first distance, the positive effect of using multiple recorded signal strengths for a device is reduced. The first distance may therefore be between 2 and 10 times as long as the second distance.

Figure 4:
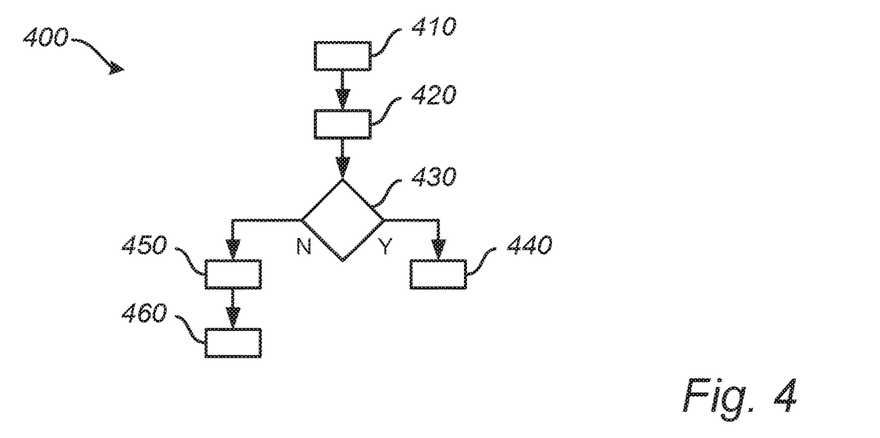
FIG. 4 is a flow chart of a method performed by the system shown in FIG. 1, according to an embodiment.

FIG. 4 is a flow chart of a method 400 performed by the system 100 described with reference to FIG. 1 (or performed by the processing means 120 in the system 100).

The method 400 starts by obtaining 410 information about signal strengths recorded at the respective devices 110 when attempting to receive the wireless signal 212 transmitted by the electronic label 210.

In the present embodiment, there are one or more reference electronic labels 220 and 230 arranged in the area 300. The reference electronic labels 220 and 230 may be of the same type as the electronic label 210 described with reference to FIG. 1, but the positions of the reference electronic labels 220 and 230 may have been determined earlier, and may have been stored in a memory 121.

The method 400 continues by obtaining 420, for each of the reference electronic labels 220 and 230, information about signal strengths recorded at the respective devices 110 when attempting to receive a wireless signal transmitted by the reference electronic label.

The method 400 then continues by comparing 430, for each of the reference electronic labels 220 and 230, the recorded signal strengths associated with the electronic label 210 to the recorded signal strengths associated with the reference electronic label.

If the pattern formed by the recorded signal strengths associated with the electronic label 210 is sufficiently similar to a pattern formed by the recorded signal strengths associated with a reference electronic label (indicated by 'Y' in FIG. 4), the method 400 continues by estimating 440 the position of the electronic label 210 based on a position of the reference electronic label. For example, if the pattern formed by the recorded signal strengths associated with the electronic label 210 is only sufficiently similar to a pattern formed by the recorded signal strengths associated with one reference electronic label, the position of the electronic label 210 may be estimated as the position of the reference electronic label. If, on the other hand, the pattern formed by the recorded signal strengths associated with the electronic label 210 is sufficiently similar to patterns formed by the recorded signal strengths associated with several reference electronic labels, the position of the electronic label 210 may be estimated as an average of the positions of these reference electronic labels (e.g. as a weighted average with weights proportional to similarities between the patterns associated with the respective reference electronic labels and the pattern associated with the electronic label 210).

In the example shown in FIG. 1, the electronic label 210 is located quite far from the reference electronic labels 220 and 230. The pattern of recorded signal strengths for the electronic label 210 would therefore not be similar to the patterns of recorded signal strengths for any of the reference electronic labels 220, 230. The electronic label 240, on the other hand, is close to the reference electronic label 220, so the patterns associated with these two labels may be similar. The position of the electronic label 240 may therefore be estimated as the position of the reference electronic label 220. Similarly, the electronic label 250 is likely to have a pattern of recorded signal strengths similar to the corresponding pattern of the reference electronic label 230. The position of the electronic label 250 may therefore be estimated as the position of the reference electronic label 230.

Placing many reference electronic labels in the area 300 may be time consuming, and/or may occupy space needed for other things. Further, the method 400 relies on the positions of the reference electronic labels being known (or tracked over time in case the reference electronic labels are moved). Hence, it may be desirable to keep the number of reference electronic labels as low as possible. Reference electronic labels may therefore be arranged at position where positioning using the weighted average may be particularly difficult, i.e. where the potential for improving accuracy of estimated positions is relatively high.

In case no devices 110 are arranged along an edge 310 of the area 300, as illustrated in FIG. 1, the weighted average may not be able to provide an estimated position along the edge 310 (unless positions 116-119 spaced from the device positions 111 are included in the weighted average, as described above with reference to FIG. 3). One or more reference electronic labels 220 may therefore be arranged along the edge 310 of the area 300.

Without use of reference electronic labels, the weighted average may for example not be able to provide an estimated position outside the convex hull of the positions of the devices 110 (unless positions 116-119 spaced from the device positions 111 are included in the weighted average, as described above with reference to FIG. 3). One or more reference electronic labels 220 may therefore be arranged outside the convex hull of the positions of the devices 110, such as along the edge 310 of the area.

If the area 300 comprises a container 320 (such as a fridge or freezer in a retail store), as illustrated in FIG. 1, wireless signals transmitted from electronic labels 250 inside the container 320 may be obstructed, and estimations of the label position based on a weighted average may not be as accurate as desired. A reference electronic label 230 may therefore be arranged in the container 320, so that the particular pattern of signal strengths characteristic of an electronic label 250 in the container 320 may be recognized (or detected) and the position of the electronic label 250 may be estimated as a position within the container 320. The container 320 may for example comprise a door (not shown in FIG. 1) behind which the electronic label 250 and the reference electronic label 230 are arranged. The door may for example disrupt at least some wireless signals.

If the pattern formed by the recorded signal strengths associated with an electronic label 210 is not sufficiently similar to any pattern formed by recorded signal strengths associated with reference electronic labels 220, 230 arranged in the area 300 (as is the case for the electronic label 210 in FIG. 1), the position of the electronic label 210 may instead be estimated based on a weighted average of device positions 111, as described above with reference to FIGS. 1 and 3. If so, the method 400 instead continues after step 430 by forming 450 weights, for positions 111 associated with the devices 110, based on the signal strengths recorded at the corresponding devices 110, and estimating 460 the position of the electronic label 210 as a weighted average of the positions 111 associated with the devices 110, wherein the positions 111 are weighted by the weights.

There are many different ways to measure whether two patterns of recorded signal strengths are sufficiently similar.

The method 400 may for example comprise obtaining a value by applying a function to the recorded signal strengths associated with the electronic label 210 and the recorded signal strengths associated with the reference electronic label 220, 230, wherein the obtained value is indicative of a similarity between the two patterns. The two patterns are then sufficiently similar on a condition that the obtained value is above a threshold. The obtained value may for example be a correlation between the two patterns, e.g. in the form of a Pearson product-moment correlation coefficient. In other words, the function applied to the patterns of signal strengths may be a function adapted to provide the correlation as output.

Alternatively, the method 400 may comprise obtaining a value by applying a function to the recorded signal strengths associated with the electronic label 210 and the recorded signal strengths associated with the reference electronic label 220, 230, wherein the obtained value is indicative of a dissimilarity between the two patterns. The two patterns are then sufficiently similar on a condition that the obtained value is below a threshold. The obtained value may for example be computed as a Euclidean distance between the two patterns of signal strengths. In other words, the function applied to the patterns of signal strengths may be adapted to provide the Euclidean distance as output. Other types of distances than Euclidean distances may also be employed, such as other metrics or norms.

In some embodiments, the weighted average employed in step 460 to estimate the position 211 of the electronic label 210 may include the positions of the reference electronic labels arranged in the area 300. This allows the weighted average to provide an estimated position closer to the reference electronic labels and there may be no need to include in the method 400 a separate estimation step 440 for taking into account the information provided via use of the reference electronic labels.

For each reference electronic label, the weight to be employed for its position in the weighted average may be formed based on a similarity between a pattern formed by the recorded signal strengths associated with the electronic label 210 and a pattern formed by the recorded signal strengths associated with the reference electronic label. The weight by which a position of a reference electronic label is weighted in the weighted average may be relatively larger if the similarity between the two patterns is high, and may be relatively smaller if the similarity between the two patterns is low. The similarity may for example be computed as a correlation between the two patterns, or may be estimated via a Euclidean distance between the two patterns.

Denoting the positions associated with the devices 110 by $(x_i, y_i)$, the positions of the reference electronic labels by $(x_i^r, y_i^r)$, and the associated weights by $w_i$ and $w_i^r$ respectively, the weighted average estimating the position 211 of the electronic label 210 may be expressed as $$(x_0, y_0) = \left( \frac{\sum_{i=1}^{M} w_i^r x_i^r + \sum_{i=1}^{N} w_i x_i}{\sum_{i=1}^{M} w_i^r + \sum_{i=1}^{N} w_i}, \frac{\sum_{i=1}^{M} w_i^r y_i^r + \sum_{i=1}^{N} w_i y_i}{\sum_{i=1}^{M} w_i^r + \sum_{i=1}^{N} w_i} \right)$$

where N is the number of devices 110 and M is the number of reference electronic labels.

Figure 5:
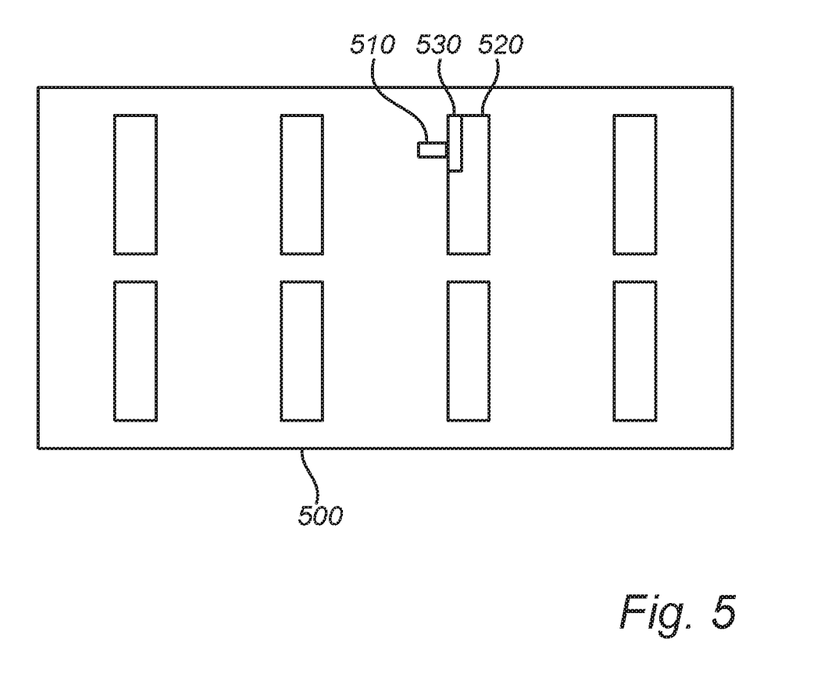
FIG. 5 shows an electronic label arranged in an area for visually conveying information about an object in its vicinity.

FIG. 5 shows an electronic label 510 arranged in an area 500 for visually conveying information about an object 520 in its vicinity. The electronic label 510 may be of the same type as the electronic label 210 described with reference to FIG. 2.

In the present example, the area 500 is the interior of a retail store and the object 520 is a product arranged at a fixture 530 (e.g. a shelf). The electronic label 510 is arranged to provide information about the product 520, such as the price of the product 520. The method 400 described with reference to FIG. 4 may for example be employed to estimate the position of the electronic label 510 in the area 500. As the electronic label 510 is arranged close to the object 520, the weighted average formed in step 460 of the method 400 (or the position of a reference electronic label from step 440 of the method 400) may be employed as an estimate of the position of the product 520 in the area 500. Such an estimate may for example be employed to identify the fixture 530 at which the product 520 is arranged.

In stores it is common to refer to categories, which are groups of products, represented by groups of labels. It is sometimes desirable to position the category instead of the individual labels. By positioning the category as an average of the individual label positions, the position of the category may be more accurate and less sensitive to noise or obstacles. Further, instead of estimating the category position as a regular average of the label positions, a more advanced method may be employed which may treat outliers or split categories in a different way.

Figure 6:
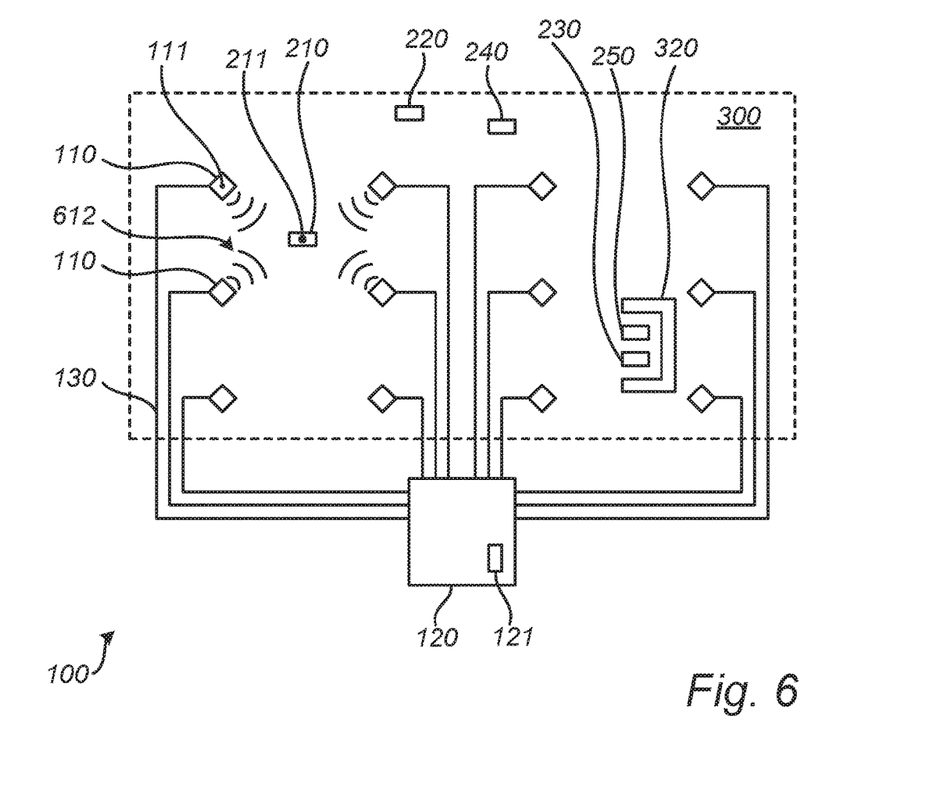
FIG. 6 is an overview of a system for estimating a position of an electronic label in an area, according to an embodiment.

FIG. 6 is an overview of a system 100 for estimating a position 211 of an electronic label 210 in an area 300, according to an embodiment. The system 100 in FIG. 6 may for example be the same system as the system 100 described with reference to FIG. 1. However, in the present embodiment, the signal strengths employed to estimate the position 211 of the electronic label 210 are recorded by the electronic label 210 instead of by the devices 110. More specifically, the system 100 is adapted to perform a method 700 comprising: obtaining 710 information about signal strengths recorded at the electronic label 210 when attempting to receive wireless signals 612 transmitted by the respective devices 110; forming 750 weights, for positions 111 associated with the devices, based on the signal strengths recorded at the electronic label for the corresponding devices; and estimating 760 the position 211 of the electronic label 210 as a weighted average including the positions 111, wherein the positions 111 are weighted by the weights. An overview of the method 700 is given in FIG. 7.

The electronic label 210 comprises one or more receivers 214 (or sensors) arranged to receive the wireless signals 612 transmitted by the devices 110, and to record received signal strengths.

The electronic label 210 may comprise one or more transmitters 215 for transmitting information about the recorded signal strengths to the processing means. Embodiments may also be envisaged in which the processing means 120 is arranged in the electronic label 210.

Figure 7:
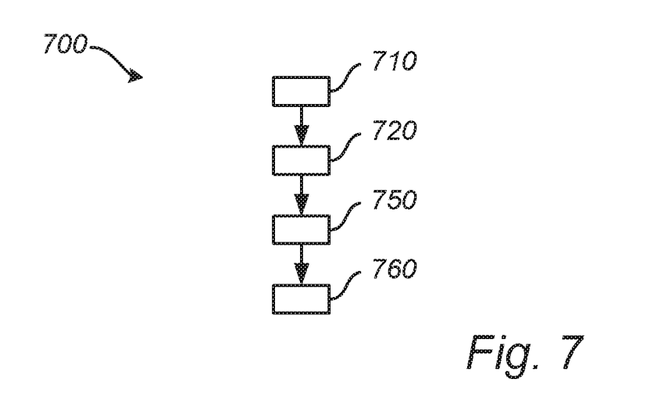
FIG. 7 is a flow chart of a method for estimating a position of an electronic label in an area, according to an embodiment.

It will be appreciated that the alternative way to record signal strengths, described with reference to FIGS. 6-7, may for example be employed in the methods and systems described with reference to FIGS. 1-5. In particular, it will be appreciated that the reference electronic labels 220 and 230, described with reference to FIG. 1, may be adapted to record signal strengths when attempting to receive wireless signals 612 transmitted by the devices 110. For example, the method 700 may comprise obtaining 720 information about signal strengths recorded at a reference electronic label when attempting to receive wireless signals 612 transmitted by the respective devices 110.

The person skilled in the art realizes that the present invention is by no means limited to the preferred embodiments described above. On the contrary, many modifications and variations are possible within the scope of the appended claims. For example, the area 300, described with reference to FIG. 1, may have more or less any shape, and the devices 110 may be distributed over the area 300 in many different ways.

It will be appreciated that the method 400 described with reference to FIG. 4, may for example employ, as part of the weighted average formed in step 460, the positions 116-119, described with reference to FIG. 3, and the associated weights.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope.

Itemized List of Embodiments

1. A method (400) for estimating a position (211) of an electronic label (210, 510) in an area (300, 500), wherein a plurality of devices (110) is distributed over the area, the method comprising:

obtaining (410) information about signal strengths recorded at the respective devices when attempting to receive a wireless signal (212) transmitted by the electronic label;

forming (450) weights, for positions (111, 116-119) associated with the devices, based on the signal strengths recorded at the corresponding devices; and estimating (460) the position of the electronic label as a weighted average including said positions, wherein said positions are weighted by said weights.

2. A method (700) for estimating a position (211) of an electronic label (210, 510) in an area (300, 500), wherein a plurality of devices (110) is distributed over the area, the method comprising:

obtaining (710) information about signal strengths recorded at the electronic label when attempting to receive wireless signals (612) transmitted by the respective devices;

forming (750) weights, for positions (111) associated with the devices, based on the signal strengths recorded at the electronic label for the corresponding devices; and estimating (760) the position of the electronic label as a weighted average including said positions, wherein said positions are weighted by said weights.

3. The method of embodiment 1, wherein a device (110) is adapted to receive wireless signals from a first direction (112) and from a second direction (113), wherein the obtained information includes information about signal strengths recorded at said device when attempting to receive said wireless signal from said first direction and from said second direction, respectively, wherein said weighted average includes a first position (116) spaced a distance from said device in said first direction and a second position (117) spaced a distance from said device in said second direction, wherein the weight by which said first position is weighted in said weighted average is based on the recorded signal strength for said first direction; and wherein the weight by which said second position is weighted in said weighted average is based on the recorded signal strength for said second direction.

4. The method of embodiment 3, wherein the devices are spaced from each other by a first distance (D), wherein said first position and said second position are both located at a second distance (d) from said device, and wherein the first distance is longer than the second distance.

5. The method of any of the preceding embodiments, comprising:

obtaining (420) information about signal strengths recorded at the respective devices when attempting to receive a wireless signal transmitted by a reference electronic label (220, 230); or obtaining (720) information about signal strengths recorded at a reference electronic label (220, 230) when attempting to receive wireless signals (612) transmitted by the respective devices, wherein the method further comprises:

comparing (430) the recorded signal strengths associated with said electronic label to the recorded signal strengths associated with said reference electronic label; and in response to a pattern formed by the recorded signal strengths associated with said electronic label being sufficiently similar to a pattern formed by the recorded signal strengths associated with said reference electronic label, estimating (440) the position of said electronic label based on a position of said reference electronic label.

6. The method of embodiment 5, comprising:

obtaining a value by applying a function to the recorded signal strengths associated with said electronic label and the recorded signal strengths associated with said reference electronic label, wherein the obtained value is indicative of a similarity between the two patterns, the two patterns being sufficiently similar on a condition that the obtained value is above a threshold; or obtaining a value by applying a function to the recorded signal strengths associated with said electronic label and the recorded signal strengths associated with said reference electronic label, the obtained value being indicative of a dissimilarity between the two patterns, the two patterns being sufficiently similar on a condition that the obtained value is below a threshold.

7. The method of any of embodiments 1-4, comprising:

obtaining (420) information about signal strengths recorded at the respective devices when attempting to receive a wireless signal transmitted by a reference electronic label (220, 230); or obtaining (720) information about signal strengths recorded at a reference electronic label (220, 230) when attempting to receive wireless signals transmitted by the respective devices, wherein the method further comprises:

forming a weight based on a similarity between a pattern formed by the recorded signal strengths associated with said electronic label and a pattern formed by the recorded signal strengths associated with said reference electronic label, wherein a position of the reference electronic label is included in said weighted average, and wherein the weight by which the position of the reference electronic label is weighted in said weighted average is the formed weight.

8. The method of any of embodiments 5-7, wherein said reference electronic label is arranged along an edge (310) of the area.

9. The method of any of embodiments 5-8, wherein a container (320) is arranged in the area, and wherein said reference electronic label is arranged in the container.

10. The method of any of the preceding embodiments, wherein the wireless signal transmitted by said electronic label is an infrared signal or a radio frequency signal.

11. The method of any of the preceding embodiments, wherein the electronic label is arranged in the area for visually conveying information about an object (520) in its vicinity, the method comprising:

estimating a position of said object as said weighted average.

12. A computer program product comprising a computer-readable medium with instructions for performing the method of any of embodiments 1-11.

13. A system (100) for estimating a position (211) of an electronic label (210) in an area (300), the system being configured to:

obtain information about signal strengths recorded at respective devices (110) when attempting to receive a wireless signal (212) transmitted by the electronic label;

form weights, for positions (111, 116-119) associated with the devices, based on the signal strengths recorded at the corresponding devices; and estimate the position of the electronic label as a weighted average including said positions, wherein said positions are weighted by said weights.

14. A system (100) for estimating a position (211) of an electronic label (210) in an area (300), the system being configured to:

obtain information about signal strengths recorded at the electronic label when attempting to receive wireless signals (612) transmitted by respective devices (110);

form weights, for positions (111) associated with the devices, based on the signal strengths recorded at the electronic label for the corresponding devices; and estimate the position of the electronic label as a weighted average including said positions, wherein said positions are weighted by said weights. device 15. The system of embodiment 13, comprising a plurality of devices (110) distributed over the area, wherein a device (110) is adapted to receive wireless signals from a first direction (112) and from a second direction (113), wherein the obtained information includes information about signal strengths recorded at said device when attempting to receive said wireless signal from said first direction and from said second direction, respectively, wherein said weighted average includes a first position (116) spaced a distance from said device in said first direction and a second position (117) spaced a distance from said device in said second direction, wherein the weight by which said first position is weighted in said weighted average is based on the recorded signal strength for said first direction; and wherein the weight by which said second position is weighted in said weighted average is based on the recorded signal strength for said second direction.

The invention claimed is:

1. A method for estimating a position of an electronic label in an area, wherein a plurality of devices is distributed over the area, the method comprising:
    obtaining information about signal strengths recorded at the respective devices when attempting to receive a wireless signal transmitted by the electronic label;
    forming weights, for positions associated with the devices, based on the signal strengths recorded at the corresponding devices; and
    estimating the position of the electronic label as a weighted average including said positions, wherein said positions are weighted by said weights;
    wherein a device is adapted to receive wireless signals from a first direction and from a second direction,
    wherein the obtained information includes information about signal strengths recorded at said device when attempting to receive said wireless signal from said first direction and from said second direction, respectively,
    wherein said weighted average includes a first position spaced a distance from said device in said first direction and a second position spaced a distance from said device in said second direction,
    wherein the weight by which said first position is weighted in said weighted average is based on the recorded signal strength for said first direction; and
    wherein the weight by which said second position is weighted in said weighted average is based on the recorded signal strength for said second direction.

2. The method of claim 1, wherein the devices are spaced from each other by a first distance, wherein said first position and said second position are both located at a second distance from said device, and wherein the first distance is longer than the second distance.

3. A computer program product comprising a non-transitory computer-readable medium with instructions for performing the method of claim 1.

4. A method for estimating a position of an electronic label in an area, wherein a plurality of devices is distributed over the area, the method comprising:
    obtaining information about signal strengths recorded at the respective devices when attempting to receive a wireless signal transmitted by the electronic label;
    forming weights, for positions associated with the devices, based on the signal strengths recorded at the corresponding devices; and
    estimating the position of the electronic label as a weighted average including said positions, wherein said positions are weighted by said weights;
    obtaining information about signal strengths recorded at the respective devices when attempting to receive a wireless signal transmitted by a reference electronic label,
    wherein the method further comprises:
    comparing the recorded signal strengths associated with said electronic label to the recorded signal strengths associated with said reference electronic label; and
    in response to a pattern formed by the recorded signal strengths associated with said electronic label being sufficiently similar to a pattern formed by the recorded signal strengths associated with said reference electronic label, estimating the position of said electronic label based on a position of said reference electronic label.

5. The method of claim 4, comprising:
    obtaining a value by applying a function to the recorded signal strengths associated with said electronic label and the recorded signal strengths associated with said reference electronic label, wherein the obtained value is indicative of a similarity between the two patterns, the two patterns being sufficiently similar on a condition that the obtained value is above a threshold; or
    obtaining a value by applying a function to the recorded signal strengths associated with said electronic label and the recorded signal strengths associated with said reference electronic label, the obtained value being indicative of a dissimilarity between the two patterns, the two patterns being sufficiently similar on a condition that the obtained value is below a threshold.

6. A computer program product comprising a non-transitory computer-readable medium with instructions for performing the method of claim 4.

7. A method for estimating a position of an electronic label in an area, wherein a plurality of devices is distributed over the area, the method comprising:
    obtaining information about signal strengths recorded at the electronic label when attempting to receive wireless signals transmitted by the respective devices;
    forming weights, for positions associated with the devices, based on the signal strengths recorded at the electronic label for the corresponding devices; and
    estimating the position of the electronic label as a weighted average including said positions, wherein said positions are weighted by said weights;
    obtaining information about signal strengths recorded at a reference electronic label when attempting to receive wireless signals transmitted by the respective devices,
    wherein the method further comprises:
    comparing the recorded signal strengths associated with said electronic label to the recorded signal strengths associated with said reference electronic label; and
    in response to a pattern formed by the recorded signal strengths associated with said electronic label being sufficiently similar to a pattern formed by the recorded signal strengths associated with said reference electronic label, estimating the position of said electronic label based on a position of said reference electronic label.

8. A method for estimating a position of an electronic label in an area, wherein a plurality of devices is distributed over the area, the method comprising:
    obtaining information about signal strengths recorded at the respective devices when attempting to receive a wireless signal transmitted by the electronic label;

forming weights, for positions associated with the devices, based on the signal strengths recorded at the corresponding devices; and estimating the position of the electronic label as a weighted average including said positions, wherein said positions are weighted by said weights;

obtaining information about signal strengths recorded at the respective devices when attempting to receive a wireless signal transmitted by a reference electronic label, wherein the method further comprises:

forming a weight based on a similarity between a pattern formed by the recorded signal strengths associated with said electronic label and a pattern formed by the recorded signal strengths associated with said reference electronic label, wherein a position of the reference electronic label is included in said weighted average, and wherein the weight by which the position of the reference electronic label is weighted in said weighted average is the formed weight.

9. The method of claim 8, wherein said reference electronic label is arranged along an edge of the area.

10. The method of claim 8, wherein said reference electronic label is arranged outside a convex hull of the positions associated with said devices.

11. The method of claim 8, wherein a container is arranged in the area, and wherein said reference electronic label is arranged in the container.

12. The method of claim 11, wherein said container comprises a door, and wherein the reference electronic label is arranged behind said door.

13. A computer program product comprising a non-transitory computer-readable medium with instructions for performing the method of claim 8.

14. A method for estimating a position of an electronic label in an area, wherein a plurality of devices is distributed over the area, the method comprising:

obtaining information about signal strengths recorded at the electronic label when attempting to receive wireless signals transmitted by the respective devices;

forming weights, for positions associated with the devices, based on the signal strengths recorded at the electronic label for the corresponding devices; and estimating the position of the electronic label as a weighted average including said positions, wherein said positions are weighted by said weights;

obtaining information about signal strengths recorded at a reference electronic label when attempting to receive wireless signals transmitted by the respective devices, wherein the method further comprises:

forming a weight based on a similarity between a pattern formed by the recorded signal strengths associated with said electronic label and a pattern formed by the recorded signal strengths associated with said reference electronic label, wherein a position of the reference electronic label is included in said weighted average, and wherein the weight by which the position of the reference electronic label is weighted in said weighted average is the formed weight.

15. The method of claim 14, wherein said reference electronic label is arranged along an edge of the area.

16. The method of claim 14, wherein said reference electronic label is arranged outside a convex hull of the positions associated with said devices.

17. The method of claim 14, wherein a container is arranged in the area, and wherein said reference electronic label is arranged in the container.

18. The method of claim 17, wherein said container comprises a door, and wherein the reference electronic label is arranged behind said door.

* * * * *